Patented July 5, 1938

2,122,862

UNITED STATES PATENT OFFICE 2,122,862

COLORED ROOFING

Carl E. Hillers, Charlottesville, Va., assignor to Blue Ridge Slate Corporation, Charlottesville, Va., a corporation of Virginia No Drawing. Application December 30, 1936, Serial No. 118,270

9 Claims. (Cl. 91—70)

This invention relates to new and useful improvements in methods of coloring roofing elements and the products thereof.

Certain cements, usually in colored form, are generally used to color coat mineral surfaced asphalt shingles and the like. The cement is usually sprayed or otherwise spread over the shingles. Hydraulic cement is used and, because of its slow rate of setting, many precautions must be taken to insure against objectionable characteristics in the finished product. Furthermore, because of the nature of the cements used and their curing characteristics, shingles coated by the usual methods are frequently handled several times, necessitating stacking and restacking, which is costly from the standpoint of the labor involved and from the hazard of marring, defacing or breaking the stiffened hydraulic cement coated product.

I have found that certain compositions of matter which show a pronounced tendency to harden rapidly may be sprayed upon or spread over roofing elements. Instead of the usual curing period of two to three weeks, my method requires one or a few days.

My compositions can be applied not only to mineral surfaced asphalt roofing, but also to natural slate shingles, cement shingles, asbestos-cement shingles, tin or other metal in sheets or elements, etc., with a similar reduction in curing time over the compositions as present employed in the coloring of such roofing elements. I am, of course, referring to the curing time of a layer or film of colored material applied to one or both sides of such rigid type shingles and not to shingles which are artificially colored all the way through.

Natural slate shingles, for example, occur in numerous color groups but none of these groups is characterized by strong or bright colors. By the method of this invention the color of the slate may be intensified; for example, greyish green slate may be colored bright green, reddish brown slate may be colored bright red, or the color group of the natural slate may be entirely changed as, for example, to red slate may be applied blue or a green colored composition which will harden to a firmly bound or keyed layer of long life and lasting beauty.

The methods employed in the application of compositions of this invention are in general similar whether the compositions are applied to natural slates or other rigid roofing, or to mineral surfaced asphalt roofing. However, the composition may be applied to the asphalt roofing while the latter is still in the form of a continuous sheet, or it may be applied to the shingles after they have been cut.

I will now illustrate the method I employ. Principally, with modifications as disclosed later on, coloring agents, solutions of alkali-metal silicates and barium fluosilicate are employed, and these may, as disclosed in my copending application Serial No. 114,014, filed December 3, 1936, be sprayed on a roofing element simultaneously by separate spray guns, after first mixing the coloring agent with either the alkali-metal silicate solution or the barium fluosilicate. Chemical reaction proceeds quite rapidly between the alkali-metal silicate solution and barium fluosilicate. In color-coating roofing sheets, webs or elements, it is frequently well to retard the speed of the chemical reaction by the incorporation of a ground solid diluent or filler, and I will illustrate the invention more completely with one or more of the principal ingredients thus modified.

I first prepare a powder consisting of finely ground barium fluosilicate, one or more coloring agents, and a filler. The coloring agent may be chromium oxide to produce a green composition. The filler may be crushed stone of any character, but preference is given to stone which is in itself weather resistant and not subject to marked changes upon exposure to the elements. For pastel or light colored compositions I prefer a white or light colored filler such as quartz, quartzite, feldspar, crushed sandstone or light pebbles. For other colors the use of a filler material similar in color to the desired shades permits the use of less color agent. Examples: greenstone, red slate, brown iron ores, etc. In preparing the stone or filler for use in the composition, it may be crushed, ground and screened to pass 100% through a 65-mesh screen. Such a product will usually contain percentages of the finer sizings such as a portion which will pass the 200-mesh screen and a portion which will pass the 300-mesh screen, etc. Although the 65-mesh screen is used as the top screen in this example, other sizes of screens may be used for the top screen. When the composition is to be applied in a thin layer I find that the 65-mesh screen is to be preferred to a coarser screen of the sizing of the 10-mesh or 20-mesh, and the 65-mesh screen produces slightly larger yield in a given sizing than the 100-mesh and is therefore more economical.

As a working formula 85 lbs. of crushed and screened white quartzite, 15 lbs. of powdered barium fluosilicate and 15 lbs. of chromium oxide may be stirred or ground together until intimately mixed. The mixed powder is then stirred into 46 to 50 lbs. of a solution of sodium silicate (factor—Na$_2$O:3.25SiO$_2$) of approximately 37 degrees Baumé for 30 seconds. The heavy paint resulting may be spread by trowel or rollers or sprayed on sheets of mineral surfaced asphalt roofing. This must be done with a minimum loss of time, and suitable batches of the composition should be made up to allow application before the chemical reaction between the sodium silicate and the barium fluosilicate has proceeded too far.

The rapid rate at which the composition sets is due probably to the decomposition of the barium fluosilicate by the alkali of the sodium silicate, or it might be better stated as due to the gradual removal of the alkali-metal (or its oxide or hydroxide) from the alkali-metal silicate by chemical reaction with barium fluosilicate. During this reaction it is possible that a skeleton coating of interlocking silica, hydrated silica, silicic acid or some similar material is set up simultaneously with the other reaction products. The final composition probably contains, besides a certain proportion of the starting material, the fluorides of sodium and barium, the silicate of barium, and silica or hydrated silica, although the identity of the chemical compounds in the composition, after reactions have occurred, is very difficult to establish. For that reason the foregoing is to be considered merely as an attempt to explain the changes which occur and is not intended to limit this invention to the reaction products suggested.

The coated roofing material may be cut up into shingles and stacked into bundles. The coating will continue to harden as a result of reaction between the ingredients, and at 90° F. the coating becomes sufficiently hard and weather-resistant so that the shingles may be applied to a roof in about three days' time. Inasmuch as the composition hardens by chemical reaction, the speed of the reaction is dependent upon the temperature. I prefer to operate at 90° F or higher, although the process of this invention may be conducted at other temperatures. When the composition is applied to a sheet of mineral-surfaced roofing as it comes from the roofing machine in a continuous web, the temperature of the roofing may be so controlled that it will not be necessary to warm the sheet of roofing as a separate step or operation. If, however, the roofing is at too high a temperature, the composition may show a tendency to set up so rapidly that it cannot be evenly spread. This is not always objectionable because irregular application frequently produces pleasing color effects.

The materials from which the composition is produced should be neither too warm nor too cold because the former condition results in very rapid reaction while the latter condition may produce too slow a rate of setting.

While the above specified amounts of barium fluosilicate, filler, coloring agent and sodium silicate may be varied, I have not found it practical to decrease the amount of sodium silicate below the point where a workable composition or heavy paint is produced; because when smaller amounts of sodium silicate are used, the composition becomes too plastic for easy application or spreading. If too large an amount of sodium silicate is used, the rate of setting of the composition is retarded, the weather resistance of the final coating is somewhat impaired and there is a possibility that the coating may effloresce. If a portion of the sodium silicate solution is replaced by water in small substitution, or if a solution of slightly greater concentration is used, the results are usually satisfactory. However, if the replacement by water be excessive, the strength and weathering quality of the coating are impaired. Furthermore, if too large an amount of water is added to the composition or, more especially, if a freshly coated layer of the composition comes in contact with water, there is apt to be a leaching out of the water soluble alkali-metal silicate and the residual coating may be quite deficient in strength, hardness and weather resistance, whereas if the solution is too concentrated, then the resulting composition is difficult to spread or apply.

The sodium silicate may be replaced by potassium silicate, or a mixture of sodium silicate and potassium silicate may be used instead of sodium silicate. Within reasonable limits, silicate solutions of other factors than the one of the example may be used.

The amount of barium fluosilicate may be increased, and where a white or light colored composition is desired, such increases may assist in reducing the amount of white pigment necessary. However, if too much barium fluosilicate is used, the composition may tend to set up so rapidly that at times insufficient time is allowed for spreading or applying the composition. If the amount of barium silicate be reduced too greatly the weathering qualities of the final product are impaired and the coating may show a tendency to effloresce.

When mineral surfaced roofing is used, the surfacing may be of slate, greenstone, quartz, feldspar, glass or such other granular material as is employed in roofing manufacture. The amount of filler may be varied over considerable limits provided that in making such variations the effect of its increased thickening action upon the paints when larger amounts are used is taken into account. The amount of filler may likewise be decreased, but if too little filler is used the composition tends to set up too rapidly and it may even result in insufficient mixing of the powder and liquid to obtain uniform distribution.

I prefer to use color pigments which are permanent upon exposure to the elements but do not wish to limit the process of this invention to any particular color or type of pigment. I have found that chromium oxide and hydroxide, iron oxide and hydroxide pigments, synthetic cobalt-aluminum-zinc-silicate blues, cadmium sulfide and selenide colors, zinc oxide, lithopone, titanium oxide, metal powders and other pigments are well suited to the process of this invention.

Under certain conditions of setting and drying of the compositions of this invention it may be found that multi-color effects are produced. These effects may be eminently desirable if they can be controlled and reproduced. I have found that the production of a definite color from a given composition (when applied to roofing sheets or shingles) is largely dependent upon the maintenance of the same rate of setting and drying. With a few exceptions the faster the coating dries the darker will be the color effect of the dried coating, and when the compositions are dried more slowly, the coatings tend to be lighter in color.

The rate of setting and drying can be controlled by regulation of the temperature as previously mentioned and also by regulation of the humidity in the air surrounding the shingles or the like while the composition layer is curing. The presence of moisture in the composition is essential for the chemical reaction between the barium fluosilicate and the alkali-metal silicate. Therefore, even if temperatures of 90° or higher are employed in setting the composition to a hard coating, some regard must be given to the moisture content of the surrounding atmosphere. I prefer to employ a high relative humidity during the early stages of the setting of the composition even when applied as a coating to shingles which are in bundles. I have obtained good results with relative humidities of the order of 85 to 90% or higher at a temperature of 90° during the first twenty-four hours or more, and subsequent reduction in the relative humidity while maintaining approximately the same temperature.

A brief summary indicating how a web of felt may be converted into color-coated shingles by a combination of some of the more common, well-known stages of roofing manufacture and the process of this invention is shown in the following steps:

First, saturating a web of felt with a waterproofing bituminous substance;

Second, applying a layer of high melt asphalt to one surface of the saturated web;

Third, applying a surfacing of mineral granules to the layer of high melt asphalt while said asphalt is still in a plastic condition;

Fourth, embedding the mineral surfacing granules in the high melt asphalt layer by the application of pressure;

Fifth, removing the excess mineral granules which have not become embedded;

Sixth, cooling the web of mineral surfaced roofing material to a temperature of about 90° F.;

Seventh, applying a colored composition to the exposed surfaces of the mineral granules on the finished web, said composition being the intermingled product of an alkali-metal silicate solution and a powdery mixture of barium fluosilicate, coloring agent and crushed mineral filler, and being capable of reacting chemically to form a hard, weather-resistant layer over the granules as previously described;

Eighth, cutting the roofing web into the desired shapes;

Ninth, forming these shapes into bundles;

Tenth, subjecting the bundles, or individual pieces if so desired, to a temperature ranging between 80° and 125° F. for a period of from one to four days while maintaining the relative humidity of the surrounding atmosphere between 85% and 100%;

Eleventh, subjecting the bundles, or individual shingles, for a period of one to two days to a temperature of 80° to 125° F. in an atmosphere where a relative humidity content of approximately 50% or less is maintained.

In setting these colored compositions at temperatures in the neighborhood of from 60° to 70° F., I have found it good practice to surround the composition with an atmosphere heavily laden with moisture for several days, thus insuring that there will be sufficient moisture to promote the chemical reaction between the akali-metal silicate and the barium fluosilicate components of the composition.

The composition should not at this stage be exposed to drafts of cool, dry air, because otherwise the finished product will tend to effloresce. After the setting has proceeded far enough, dry air promotes efflorescence to a lesser degree.

In mixing the compositions of this invention, several of the commercial types of high speed mixing apparatus may be employed. The ingredients do not have to be ground or triturated during the mixing operation. In fact, unless the ingredients are thoroughly cool before and kept cool during the mixing operation, it is exceedingly difficult to produce an intimate grinding action without having so much heat developed that chemical reaction occurs between the ingredients at too rapid a rate. However, grinding is unnecessary at this stage. Mere intermingling is sufficient to produce a composition of the desired qualities. The intermingling can be stopped when all portions of the ingredients exhibit the same color and approximately the same fluidity, which can be accomplished in a mixer consisting of a revolving can in which is submerged an oppositely revolving series of mixing blades. One may use also a mixing tube or nozzle arrangement wherein the powder enters at one end and the alkali-metal silicate solution is injected through the walls of the tube under pressure and at such an angle that a spiral forward and intermingling movement is produced between the silicate solution and the powder, resulting in an almost instantaneous mixing operation. The latter type of mixing equipment is well adapted if the compositions are to be sprayed on the roofing elements, but it may also be used if the composition is to be smoothed on by rolls, knives, trowels, or their equivalents.

In coloring slate shingles or asbestos-cement shingles and similar rigid roofing elements, the same type of composition may be employed using the same ingredients, the same proportions, and mixed in the same way as when preparing the composition for application to mineral surfaced asphalt roofing. However, the size of roofing slates usually depends on the size of the slabs from which they are split, the presence of malformations, seams, cleavages, etc. The slate splitter and trimmer, and this refers to the hand operations, frequently produces not a succession of slates of the same size but a succession of slates of assorted sizes. I find it therefore advantageous to select bundles of slates of uniform size, regardless of what the sizes may be, and spread these slates upon a movable belt or conveyor. The coating is then applied in a continuous manner, preferably by spraying, whereupon the slates are stacked and subjected to the temperature and humidity conditions previously recommended, whereby chemical reaction between the ingredients of the composition is allowed to take place. On a smaller scale or at a slower rate of production, individual slates may be coated by hand with the composition, and the coated slates stacked into piles.

Slates are usually quite heavy and if formed into piles immediately after coating the weight of the pile is apt to cause the coating layer to adhere not only to the top of the slate to which it has been applied, but also to the bottom of the slate resting thereon. This can be prevented by allowing the coated slate to be exposed to a temperature of 90° to 100° F., approximately, more or less, for a period of a few minutes, whereby the chemical reaction between the coating ingredients is carried to the point where the immediate top thin film loses its adhesive quality and thereafter the slates may be piled to any reasonable height without danger of cementing the slates together.

On a commercial scale, and this applies to color coating mineral surfaced asphalt roofing webs as well as slate roofing elements carried on a belt, I recommend the moving of the coated roofing through a tunnel provided with a warm atmosphere, preferably, though not necessarily, humidified, to promote chemical reaction and to diminish adhesive property. However, if the web or element is too cool, moisture may be condensed from this atmosphere, especially if humidified above the dew point corresponding to the temperature of the web or element. Mottled or spotted effects are thus obtained, and even efflorescing tendencies may be induced. Uniform colors are obtained better by reducing the spread between the temperature of the web or element and this atmosphere, as by having the web or element warmer.

What is claimed is:

1. The process of color-coating roofing shingles and the like comprising: spreading a composition of intermingled alkali-metal silicate solution and a powder over the surface of the roofing shingles or the like, said powder consisting of barium fluosilicate, coloring agent and filler, and setting the composition.

2. The process of color-coating roofing shingles and the like comprising: mixing barium fluosilicate, coloring agent, filler and alkali-metal silicate, applying the mixture to the roofing shingles or the like at about 90° F., and setting the product.

3. The process of color-coating roofing shingles and the like comprising: mixing barium fluosilicate, coloring agent, filler and alkali-metal silicate, spreading the mixture on the shingles or the like while the latter is at a temperature of about 90° F., and setting the product in an atmosphere of controlled humidity.

4. The process of color-coating roofing elements comprising: securing mineral granules to a flexible web, bringing it to a temperature of about 90° F., applying to the exposed surfaces of the granules a mixture of barium fluosilicate coloring agent, filler and alkali-metal silicate, cutting the web into the desired elements, forming the elements into bundles, subjecting the bundles to a temperature ranging between 80° and 125° F. for one to four days in an atmosphere having a relative humidity of 85% to 100%, and for one to two days in an atmosphere having a relative humidity of approximately 50%.

5. The process of color-coating roofing shingles and the like comprising: spreading a composition of intermingled alkali-metal silicate solution and a powder over the surface of the roofing shingles or the like, said powder consisting of barium fluosilicate, coloring agent and filler, and setting the composition at a temperature between 80° and 125° F.

6. The process of color-coating roofing shingles and the like comprising: spreading a composition of intermingled alkali-metal silicate solution and a powder over the surface of the roofing shingles or the like, said powder consisting of barium fluosilicate, coloring agent and filler, and setting the composition at a temperature between 80° and 125° F. under controlled humidity conditions.

7. The process of color-coating roofing shingles and the like comprising: mixing alkali-metal silicate solution and a powder consisting of barium fluosilicate, coloring agent and filler, spreading the mixture over the surface of the roofing shingles or the like, and setting in a humid atmosphere.

8. As a new article of manufacture, roofing shingles and the like having at least one surface thereof colored by a weather-resistant composition consisting of the in situ reaction product of filler, coloring agent, barium fluosilicate and an aqueous dispersion of alkali-metal silicate.

9. As a new article of manufacture, shingles and the like having embedded in one surface mineral granules, said surface being entirely covered by a colored weather-resistant composition consisting of the in situ reaction product of filler, coloring agent, barium fluosilicate and an aqueous dispersion of alkali metal silicate.

CARL E. HILLERS.